July 29, 1958 J. DROUOT L'HERMINE 2,845,120
PARKING TIME REGISTER
Filed Aug. 15, 1955 4 Sheets-Sheet 1

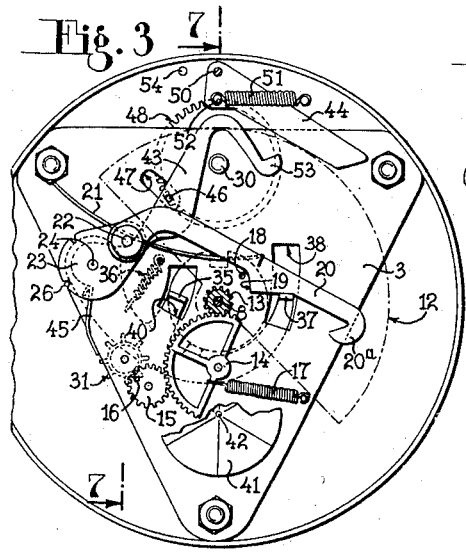
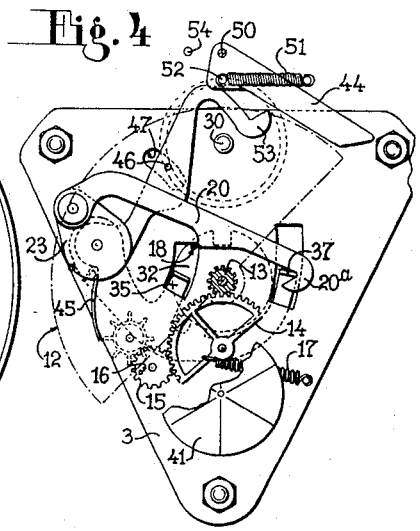
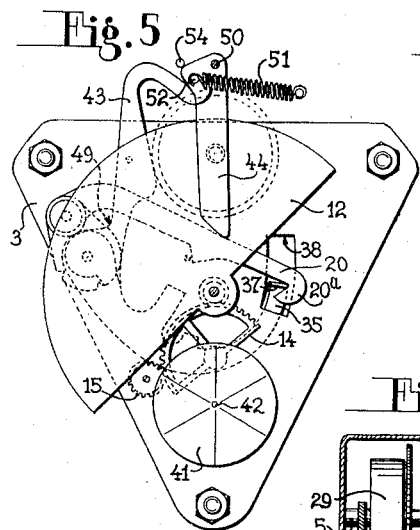
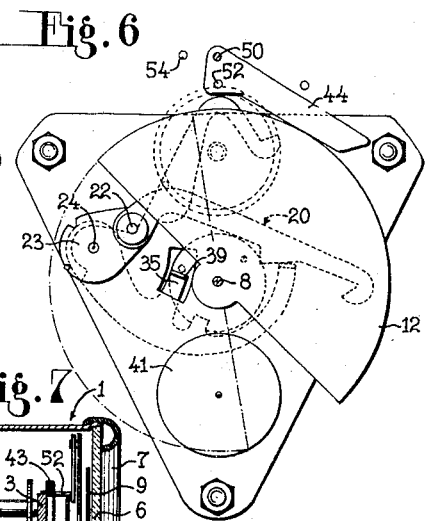
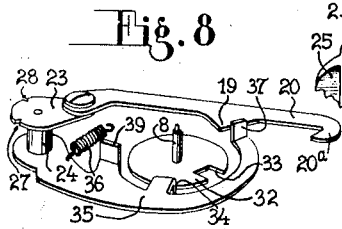
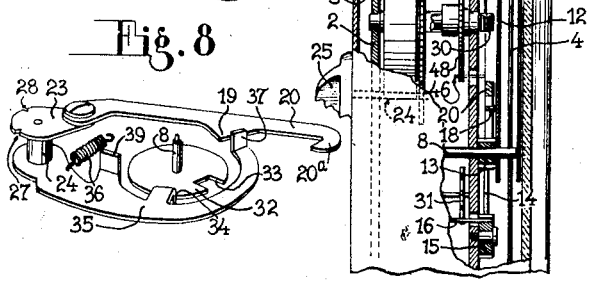

July 29, 1958  J. DROUOT L'HERMINE  2,845,120
PARKING TIME REGISTER
Filed Aug. 15, 1955  4 Sheets-Sheet 3

July 29, 1958  J. DROUOT L'HERMINE  2,845,120
PARKING TIME REGISTER
Filed Aug. 15, 1955  4 Sheets-Sheet 4
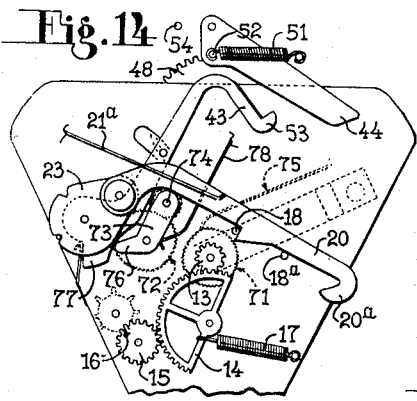
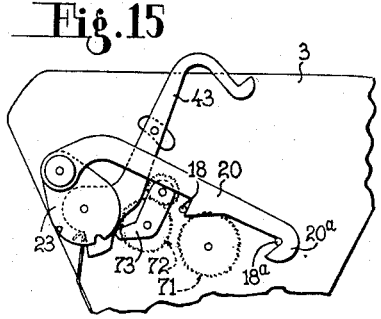
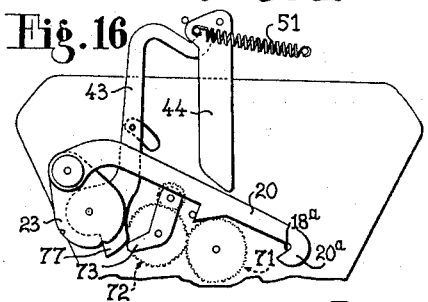
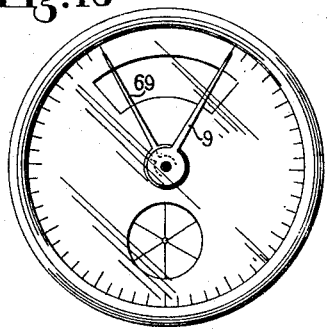
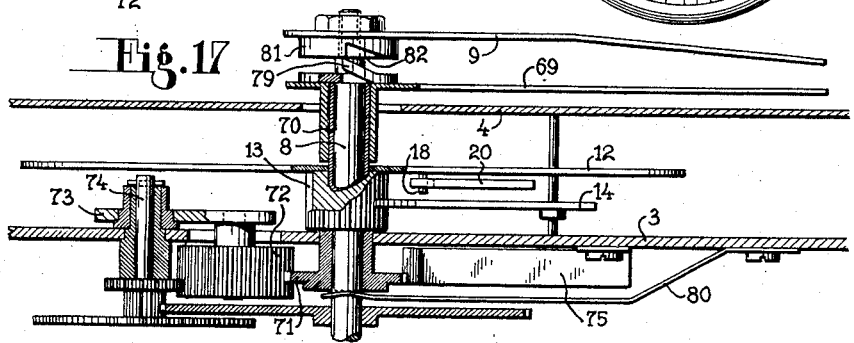
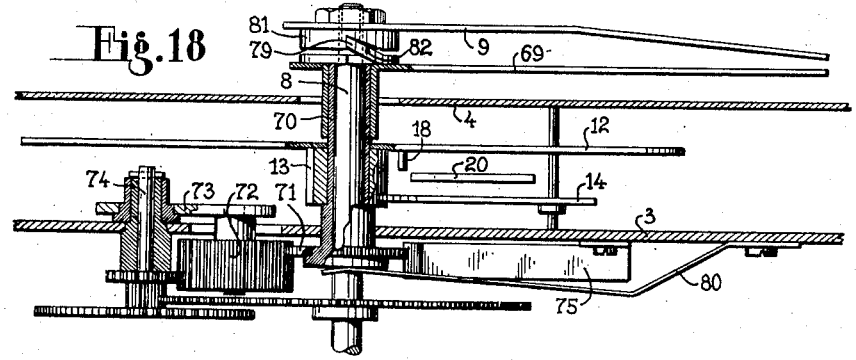

United States Patent Office 2,845,120
Patented July 29, 1958

2,845,120

PARKING TIME REGISTER

Jean Drouot l'Hermine, Paris, France, assignor to Etablissements Pylot, Vaduz, Liechtenstein, a corporation of Liechtenstein Application August 15, 1955, Serial No. 528,452

Claims priority, application France September 1, 1954

5 Claims. (Cl. 161—15)

The object of the present invention is to provide a device which is of use in the collection of parking fees, and records the parking time of road vehicles in roads, parking grounds or other reserved areas.

This device comprises, disposed within a sealed inviolable case, a stop member capable of being moved manually from outside the case between an operative position and an inoperative position corresponding respectively to forbidden and authorized parking, a clockwork mechanism combined with the stop member in such manner that this mechanism is automatically stopped from functioning when said member is in said operative position and is free to function when said member is in said inoperative position, a time meter the indications of which may be read off from outside the case, this meter being driven by the clockwork mechanism and being provided for adding the durations of successive parking periods, a locking device actuated by the meter for locking the stop member in said operative position when a given total of metered time has been reached by the meter, and an optical device for indicating constantly whether the clockwork mechanism is operating or not.

The device is intended to be supplied to users against payment of a fee corresponding to an authorized parking of a given total duration which is, for example, fifty hours and constitutes what has been termed hereinbefore "the given total." The user thus has at his disposal a kind of deposit or funds which may be drawn from in fractions of any duration within the limit of the total available time, in the same manner as funds in a banking account may be drawn from by means of cheques. At the commencement of each parking period the user places the stop member in its inoperative or authorized parking position, and this causes the release of the clockwork mechanism and the metering of the parking time. At the end of the latter, the user returns the stop member to its operative or forbidden parking position and this causes the clockwork mechanism to stop functioning until the following parking. When the total time for which the device has been set has been reached, the device is automatically locked in its forbidden parking position.

Further features and advantages of the invention will be apparent from the ensuing description.

In the accompanying drawings, given solely by way of example:

Fig. 3 is a sectional view, parallel to the front side of the case, of a part of the clockwork mechanism, the stop member in its operative or forbidden parking position, and a delayed action mechanism;

Fig. 4 is a sectional view similar to that of Fig. 3, the stop member being in its inoperative position;

Fig. 4 is a sectional view similar to that of Fig. 4, the lever of the delayed action mechanism being in its penalization position;

Fig. 6 is a view similar to that of Fig. 3, after the locking of the stop member in its operative position;

Fig. 7 is a partly side elevational and partly diametral sectional view of the device taken on line 7—7;

Fig. 8 is a perspective view of the locking mechanism;

Fig. 13 is a front view of another embodiment of the modification shown in Figs. 9 and 10;

Figs. 14, 15 and 16 are views similar to those of Figs. 3, 4 and 5 respectively, of the device shown in Fig. 1;

Fig. 17 is a diagrammatic partly sectional and partly elevational view of the modified device showing the locking mechanism in its inoperative position, and Fig. 18 is a view similar to that of Fig. 17, after the clockwork mechanism has been locked.

Figure 1:
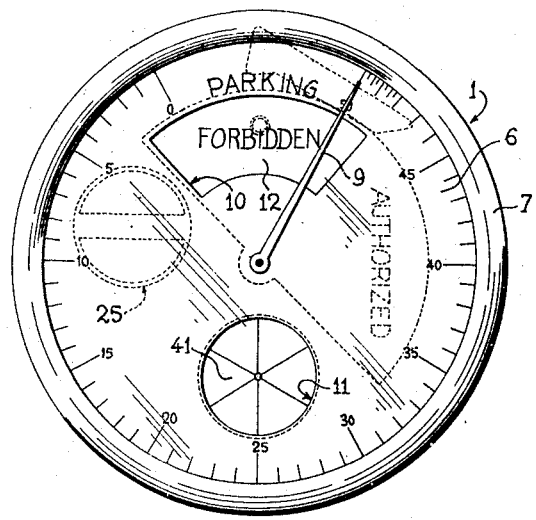
Fig. 1 is a front view of a device embodying the invention as supplied to the user in the condition in which it indicates forbidden parking.

In the embodiment shown in Figs. 1 to 8, the device comprises a cup-like cylindrical case 1 in which are disposed plates 2, 3 and 4 which are connected to the bottom of the case and to one another by posts 5 (Fig. 7) and which define compartments for receiving the various mechanisms and elements of the device. A glass 6 is applied against the plate 4 by means of a rim 7 secured to the case. As the opening of the device by the user is forbidden, this rim 7 is secured to the case by, for example, crimping, or sealed in some suitable manner.

Disposed between the glass 6 and the plate 4 and mounted on a central spindle 8, is a pointer or needle 9 which is capable of moving over a time graduation marked out along the periphery of the plate 4. The graduation extends over an arc slightly less than 360°, and in the illustrated embodiment begins at the value "50" and ends with the value "0." The plate 4, which forms a dial, comprises windows 10 and 11 the purpose of which will be explained hereinafter.

Disposed in the space between the plates 3 and 4 is a movable stop member formed by a sector member 12 which is pivotably mounted on the spindle 8 through the medium of a gear 13 (Fig. 3). The latter is fixed to the sector member and is in mesh with a sector gear 14 which drives another gear 15 provided with a lug or pin 16. The sector member 12 is movable between two positions, that is, an operative position, shown in Fig. 3, and an inoperative position, shown in Fig. 4. It is biased toward the operative position by a spring 17 fixed at one end to the sector gear 14 and at its other end to the plate 4. For the purpose of moving it to the inooperative position, in opposition to the action of the spring 17, the sector member 12 is combined with a shifting device.

This device comprises (Figs. 3 to 7) a pin 18 or the like which is carried by the sector member 12 and cooperates with the nose 19 of a pawl 20 which is urged in the engaging direction by a spring 21 and is pivoted at 22 to a crank 23. The free end 20a of the pawl 20 is in the form of a hook.

The crank 23 is prevented from rotating on a shaft 24 which is frictionally mounted in bearings formed by the plates 2 and 3 and the bottom of the case 1. A knob 25 (Figs. 1, 2 and 7) is rigidly mounted on one end of this shaft which protrudes from the case. This knob permits shifting the pivotable sector member 12. A resilient element 26 (Fig. 3) projecting from the plate 3 is adapted to engage in one or the other of two recesses 27, 28 (see Fig. 8) formed in the crank 23 so as to determine the extreme positions of the knob 25.

When the knob 25 is in the position corresponding to Fig. 3, the spring 17 maintains the sector member 12 in its illustrated operative position. When the knob is rotated to the position shown in dotted line in Fig. 2, the pawl moves the sector member about the spindle 8 until the sector member reaches the inoperative position shown in Fig. 4.

In its operative position (Fig. 3), the sector member 12 is adapted to stop a clockwork mechanism from functioning; some elements of this clockwork mechanism have been shown, namely the barrel 29, the winding spindle 30, and a wheel 31.

The connection between the sector member 12 and the clockwork mechanism is ensured by the wheel 31 of the latter and the lug 16 which is driven by the sector member through the medium of the members 13, 14 and 15. This connection is such that when the sector member is in the operative position shown in Fig. 3, the lug 16 is engaged between two teeth of the wheel 31 and prevents the clockwork mechanism from functioning.

The clockwork mechanism, the operation of which is thus controlled by the sector member 12, is adapted to drive in the clockwise direction the pointer 9 which is fixed to the spindle 8 and forms, with the graduation, a parking time meter.

Disposed in the compartment defined by the plates 3 and 4 is, furthermore, a locking device adapted to lock the pivotable sector member 12 in the operative position. This device comprises a disc 32 the centre of which is fixed to the spindle 8 of the pointer 9 (Figs. 5 to 8). Formed in this discs is a recess 33 which receives a projection 34 provided on a locking lever 35 which is pivotably mounted on the shaft 24 and urged against the disc by a spring 36. The free end of this lever forms a foot 37 which extends through an opening 38 formed in the plate 3 and is so constructed and arranged as to raise the pawl 20 when the projection 34 enters the recess 33 and to move the nose 19 out of engagement with the pin 18. The sector member is then released and is urged by the action of the spring 17 into its operative position. Between the projection 34 and the pivotable mounting of the locking lever on the shaft 24 there is also formed a foot 39 which extends through an opening 40 in the plate 3 for a purpose to be described hereinafter.

Figure 2:
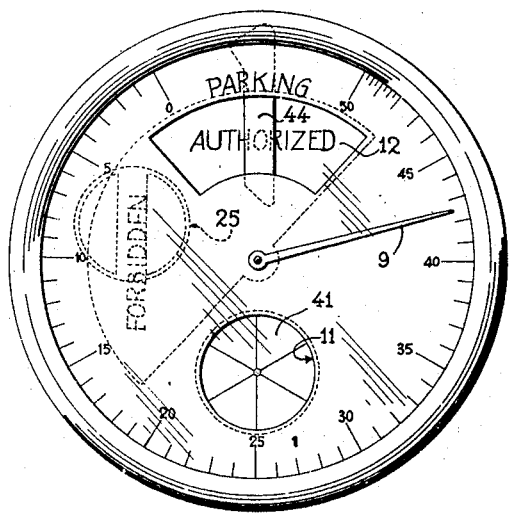
Fig. 2 is a view similar to that of Fig. 1, the device being, after a certain period of use, in the condition indicating authorized parking.

In order to indicate whether the sector member 12 is in its authorized or forbidden parking position, and whether in consequence the clockwork mechanism is working or not, the sector member 12 carries indications "forbidden" and "authorized" which respectively appear in the window 10 formed in the plate 4 when the sector member is in the operative position, as shown in Figs. 1, 3 and 6, and in the inoperative position shown in Figs. 2, 4 and 5. It will be understood that these indications may be supplemented or replaced by for example suitable colours.

To the same end of visual indication, a disc 41 is fixed to a spindle 42 of the clockwork mechanism, and carries sectors of different colours which appear in the window 11 of the dial; when the clockwork mechanism is operating, the rotation of the disc creates a luminous effect which may be seen from a distance.

The device shown in Figs. 1 to 7 comprises a delayed action mechanism combined with the clockwork mechanism and adapted to actuate a signal arm which is capable of appearing in the window 10 of the dial after the lapse of a pre-determined period of time after the commencement of a parking period, this period, which is for example one hour, being determined by the responsable authorities in order to limit the parking time.

The delayed action mechanism comprises a lever 43 pivotably mounted on the shaft 24 and capable of occupying two positions. One of these positions, which is the penalization position, is shown in Fig. 5 and corresponds to the presence of a signal arm 44 in the window 10. The other position (Figs. 3, 4 and 6) corresponds to the withdrawal of this arm. This lever, which is urged toward its position corresponding to the penalization position of the arm 44 by a spring 45, co-operates, through the medium of a lug 46 which is fixed thereto and extends through an aperture 47 in the plate 3, with a gear 48 which is frictionally engaged on the spindle 30 of the clockwork mechanism. This lever also co-operates with the crank 23 which is rigid with the shifting knob 25. This lever 43 is combined with these associated members in such manner that, in the position of the knob 25 corresponding to non-operation of the device, the lever is locked in the non-penalization position by the engagement of the lug 46 between two teeth of the gear 48, and in the position of the knob 25 corresponding to operation of the device, it is brought to the penalization position as a result of disengagement of the lug 46 from the gear 48 and the action of the spring 45 following on a rotation of this gear through a given angle which corresponds to the lapse of said limited period. The lever 43 co-operates with the crank 23 owing to a recess 49 formed in the lever and in which the shaft 22 is capable of engaging for the purpose of pivoting the lever and causing, by means of the lug 46, an angular movement of the gear 48 after which the lever 43 is locked in the non-penalization position.

The signal arm 44 is pivotably mounted on the rear face of the dial by means of a spindle 50 and is urged toward a withdrawn position, shown in Figs. 3, 4 and 6 by a spring 51 one end of which is fixed to a pin 52 projecting from both sides of the arm 44. The delayed action mechanism is combined with the signal arm 44 by means of a nose 53 which is formed at the end of the lever 43 and which enters, when the latter pivots toward its penalization position, into engagement with the pin 52 and drives the arm 44 to the position shown in Figs. 2 and 5, whereupon the arm appears in the window 10 of the dial. This extreme position of the arm 44 is determined by an abutment 54 mounted on the plate 4.

The device is used and operates in the following manner:

The user receives the device, after payment, in the following condition:

(a) The spring of the clockwork mechanism is wound up.

(b) The pointer 9 indicates on the dial a period of time corresponding to the sum paid, for example 50 hours in the illustrated example.

(c) The knob 25 is in the position shown in Fig. 1, which indicates that the clockwork mechanism is inoperative, the "forbidden" sign is visible in the window 10, and the lug 46 of the delayed action lever 43 is held stationary by the gear 48.

At least during parking in a parking area subjected to control, the device is placed inside the vehicle in such position that it can be seen from the exterior. At the beginning of a parking period, the user sets the knob 25 in the position shown in Fig. 2.

The crank 23 undergoes an angular movement owing to the rotation of the shaft 24; the pawl 20 is moved upwardly and its nose 19 drives the pin 18 carried by the sector member 12, which rotates through a certain angle and assumes the inoperative position. This has for effect, firstly, to cause the word "authorized" to appear in the window 10, and, secondly, to release the clockwork mechanism owing to the withdrawal of the lug 16 from the wheel 31. The pawl 20 is held in position by the combined action of the spring 21 and the hook 20ª engaged with the foot 37 of the lever 35. The pointer of the meter is driven in rotation and commences to indicate the parking time, and the disc 41 which rotates behind the window 11 permits ascertaining that the device is in operation.

The gear 48 driven by the clockwork mechanism acts on the lug 46 and in consequence on the delayed action lever 43 which undergoes a slow continuous angular movement about the shaft 24.

If the parking time exceeds the pre-determined allowed parking period (one hour in the chosen example), the gear 48 releases, at the moment when this period of time has elapsed, the lug 46 of the lever 43 which, under the action of the spring 45, pivots toward its penalization position (Fig. 5) and catches on the pin 52 of the signal arm 44, which is thus brought behind the window 10 in an exteriorly visible position (Fig. 2). The appearance of the signal arm 44 indicates that the parking situation of the vehicle is irregular and enables the parking inspectors to fine the vehicle driver.

So long as the knob 25 is maintained in the position corresponding to operation of the clockwork mechanism, and while the allowed parking period has not been exceeded, the pointer 9 continues to indicate the parking time on condition that it has not reached the division "0" of the graduation.

At the end of the parking, turning the knob 25 in the direction to stop the device causes the return of the "forbidden" sign in the window 10, the stopping of the clockwork mechanism, the return of the lever 43 to its initial position (Fig. 3), and, as the case may be, the withdrawal of the signal arm 44 from the window 10.

When the pointer reaches the division "0" of the graduation, the recess 33 of the disc 32 of the locking mechanism comes in front of the projection 34 of the lever 35 and the latter is driven upwardly by the action of the spring 36 and raises the pawl 20 and disengages the nose 19 from its position in which it retains the sector member 12. The latter pivots to its operative position and finally stops the clockwork mechanism, the pin 18 no longer being capable of engagement with the pawl 20. As will be understood, the user may exchange his device for another before the clockwork mechanism is locked and in so doing avoid any risk of fines. The unused parking time fee is in this case refunded.

Whether or not the authorized parking time has been used, the device returned to the distributor must be partly dismantled so as to be put into condition for further service.

After having removed the rim 7 and the glass 6, a suitable angular movement of the sector member 12 in the counterclockwise direction (Fig. 6) brings the pin 18 into contact with the foot 39 of the lever 35 and moves the latter into such position as to release disc 32 and permit the spring of the clockwork mechanism to be rewound by a suitable key engageable on spindle 30, the sector member 12 having previously uncovered the spindle 30 of the barrel 29. Once the pointer has been brought in front of the division "50," as a result of the rewinding movement, it is possible to re-load the pawl 20 on account of the cooperation of the hook 20ᵃ with the foot 37; the preparation of the device for further service is completed by replacing the glass 6 and the rim 7.

Figs. 9 to 18 show two embodiments of a modification of the device of the invention which is adapted, when the duration of a single parking period exceeds a pre-determined limit, not only to signal that the driver of the vehicle is breaking regulations, but also to apply automatically a supplementary fee which is proportional to the unauthorized parking time, this supplementary fee being added to the normal parking fee. This is obtained by means of a differential meter device.

Figure 9:
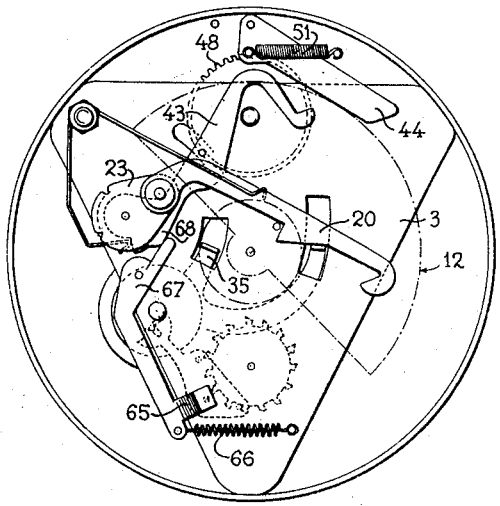
Figs. 9 and 10 are views similar to those of Figs. 3 and 5 respectively, of a modification of the device comprising a variable speed escapement.
Figure 10:
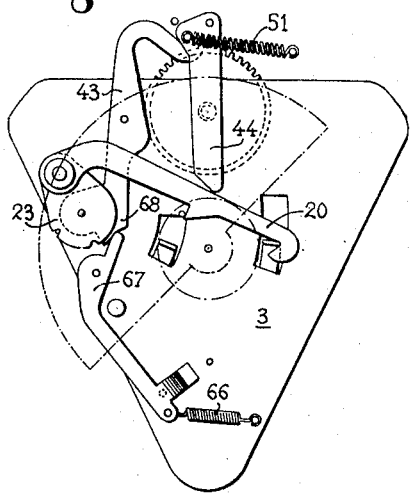
Figure 11:
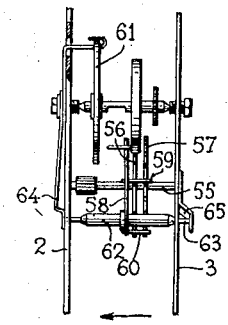
Figs. 11 and 12 are diagrammatic views of the escapement corresponding to two possible positions of the anchor.
Figure 12:
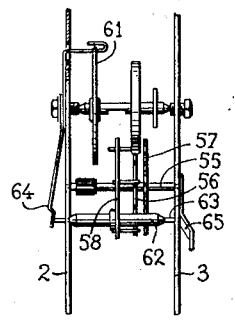

In a first embodiment of this modification, shown in Figs. 9 to 12, there is provided in the clockwork mechanism a variable velocity escapement which permits increasing the angular velocity of the pointer 9. This escapement comprises, mounted on a spindle 55 which is driven by the barrel through the medium of a wheelwork not shown, two escape wheels 56 and 57 having the same diameter, the wheel 57 forming a normal escape wheel having 15 teeth whereas the wheel 56 is a "penalization" escape wheel having less than 15 teeth, each of these teeth being in alignment, with a tooth of the wheel 57. In the illustrated example, the wheel 56 has 3 teeth. The conventional anchor 58, which receives through its pallets or pins 59 and 60, the impulses from the escape wheel 56 or 57 and transmits them to the spiral balance 61, is mounted on a spindle 62 slidably mounted in the plates 2 and 3. The length of this spindle 62 is greater than the distance between the two plates and one of its ends 63, which protrudes from the plate 3, is subjected, in one direction, to the action of a weak spring 64 which acts on the other end of the spindle, and in the other direction, corresponding to the arrow, to the action of a control cam 65 held in contact with the end 63 by a spring 66 (Fig. 9). This cam is formed at one end of a lever 67 which is pivotably mounted on the plate 3, the other end of this lever co-operating with a projection 68 formed on the lever 43 of the delayed action mechanism in such manner that the pins 59 and 60 of the anchor 58 co-operate, in response to the action of the cam 65, with the wheel 56 or the wheel 57, according to whether the lever 43 is or is not in the penalization position (Figs. 9 and 10 respectively).

In the course of normal authorized parking (Figs. 9 and 11) the lever 43, which is in its non-penalization position, holds the anchor 58 in co-operation with the wheel 57, which corresponds to normal operation of the escapement, the pointer 9 then indicates the time actually passed. It should be noted that the pins 59 and 60 are periodically, that is, every five oscillations, in contact both with a tooth of the wheel 57 and with a tooth of the wheel 56, but the presence of the latter causes no disturbance, since the alignment of the corresponding teeth is perfect.

As soon as the end of the normal parking has been reached, the lever 43 is put into its penalization position, which causes the signal arm 44 to appear in the window 10 of the dial. Simultaneously, under the action of the elements 68, 67 and 65, the pins 59 and 60 are moved in a direction of the arrow parallel to the spindle 62 and in ceasing to act on the wheel 57 engage the wheel 56; the angles of impulsion and rest are unchanged and only the angle of oscillation is modified, it being increased by an amount corresponding to the included angle of the eliminated teeth. The angular velocity of the escape wheel is therefore five times its value in the course of normal parking, i. e. the pointer travels round the dial at a velocity also five times greater and the driver is subjected to a supplementary fee corresponding to four times the normal parking fee.

Figs. 13 to 18 show another embodiment of the modification of the device comprising a differential meter device.

As can be seen from Fig. 13, the device comprises, in addition to the main pointer 9 similar to that of the preceding examples, an auxiliary pointer 69 rotatably mounted at the centre of the dial. This pointer is carried by a central tube 70 which is slidably mounted on the spindle 8 of the main pointer and extends beyond the plates 4 and 3.

The sector member 12 is mounted on the tube 70 and is prevented from moving axially along the latter. Fixed to the tube 70 is also a toothed penalization wheel 71, which is capable of meshing with a movable gear 72 driven by the barrel and mounted on a pivotable arm 73 by means of a pin 74. A resilient pawl 75 acts on the toothed wheel 71 in the manner of a brake. One end 76 of the arm 73 co-operates with a cam 77 formed on the delayed action lever 43 and is held in contact by a spring 78, the arrangement being such that when the lever 43 assumes its penalization position, the movable gear 72 is engaged with the toothed penalization wheel 71, the transmission of movement to this wheel, and in consequence to the tube 70 and the auxiliary pointer 69, ensuring the rotation of the latter in a direction opposite to that of the main pointer and at a higher velocity.

A pin 18ᵃ is provided on the plate 3 for holding, in co-operation with the spring 21a, the pawl 20 in the position shown in Figs. 15 and 16.

In the present example, the two pointers travel toward one another and a locking device is provided for stopping the clockwork mechanism when the pointers coincide.

This device comprises (Figs. 17 and 18) a tab 79 formed on the tube 70 and applied by a spring 80 against a flange 81 rigid with the spindle 8 adjacent the main pointer 9 and, furthermore, a recess 82 formed in this flange 81. The tab 79 and the recess 82 are so constructed and arranged that when the two pointers have the same angular position on the dial, the tab enters the recess and the spring 80 urges the tube 70 from the position shown in Fig. 17 to that shown in Fig. 18, the tube sliding along the spindle 8. As a result of this sliding movement, the pin 18 of the sector member 12 is moved in a direction parallel to the spindle 8 to a position where it is no longer engaged with the nose 19 of the pawl 20. The sector member 12 is thus released and returned by the spring 17 to its operative position in which it stops the clockwork mechanism from operating.

As will be understood from the foregoing, the lever 43 causes the gear 72 to mesh with the toothed wheel 71 as soon as the normal parking time has expired. The auxiliary pointer 69 is thus driven at a velocity governed by the choice of the ratios of the different wheel works, this choice depends on the severity of the fine it is intended to inflict upon the users. The main pointer 9 rotates simultaneously at its own velocity and, as explained hereinbefore, when the two pointers coincide the device ceases to operate.

It will be obvious that if the user has not parked for a period in excess of the allowed or normal parking time, the coincidence of the pointers and the stopping of the clockwork mechanism occur when the division "0" on the dial has been reached.

Although specific embodiments of the invention have been described hereinbefore, many modifications and changes may be made therein without departing from the scope of the invention as defined in the appended claims. Thus, there may be provided an arrangement permitting the speed changes of the escapement shown in Figs. 9 to 12, to be controlled by means of an exterior control member, this member being supplied in addition to the automatic arrangement described hereinbefore or being substituted for this arrangement when it concerns, for example, selectively applying one or the other of two normal parking fees.

Having now described my invention what I claim as new and desire to secure by Letters Patent is:

1. In a parking time register in combination, time measuring means, manually operable stop means operatively connected to the time measuring means and movable between an operative position in which said stop means stops operation of the time measuring means and an inoperative position in which the stop means permits operation of the time measuring means, visual means associated with the stop means and moved by said stop means to a first position when the stop means moves to said operative position and to a second position when the stop means moves to said inoperative position, whereby operation and non-operation of the time measuring means may be visually ascertained, locking means operatively connected to the time measuring means for automatically stopping the time measuring means from operating at the end of a predetermined period of measured time, a delayed action mechanism operatively connected to the stop means said stop means operatively connecting the delayed action mechanism with the time measuring means in said operative position, whereby the delayed action mechanism is driven by the time measuring means, and said delayed action mechanism being disconnectable from the time measuring means in said inoperative position, means for automatically disconnecting the delayed action mechanism from the time measuring means when said time measuring means has operated for a fraction of said predetermined period of measured time after the stop means has been brought to said inoperative position, movable responsive means operatively connected to the delayed action mechanism and said delayed action mechanism moves the responsive means from a first position to a second position when the delayed action mechanism is disconnected from the time measuring means.

2. In a parking time register according to claim 1 in which said responsive means comprises signal means visible from externally of said register and indicates in said second position thereof that said fraction of said predetermined period of measured time has been measured.

3. In a parking time register according to claim 1, further comprising means for accelerating operation of the time measuring means and in which the responsive means is operatively connected to the accelerating means so that in said first position of the responsive means the accelerating means is inoperative and permits normal operation of the time measuring means and in said second position of the responsive means the accelerating means is operative and accelerates operation of the time measuring means, thereby shortening said predetermined period of measured time at the end of which the locking means stops operation of the time measuring means.

4. In a parking time register according to claim 1, in which the time measuring means comprises a first pointer and a dial having a graduated time scale, the first pointer being movable across the scale from a first end of the scale to a second end of the scale in measuring said predetermined period of time, a second pointer movable from said second end of the scale toward said first end of the scale, said responsive means operatively connecting the second pointer to the time measuring means in said second position of the responsive means whereby the time measuring means drives the second pointer toward said first end of the scale, and disconnecting the second pointer from the time measuring means in said first position of the responsive means, said locking means cooperating with the pointers and stopping operation of the time measuring means when the pointers coincide on said scale.

5. In a parking time register according to claim 4, further comprising a case, signal means visible from external of said case, said signal means being associated with said responsive means, the signal means indicating in which of said first and second positions the responsive means is positioned.

References Cited in the file of this patent

UNITED STATES PATENTS

| 1,752,071 | Doyle | Mar. 25, 1930 |
| 2,337,194 | Hickey | Dec. 21, 1943 |
| 2,591,402 | Campbell | Apr. 1, 1952 |
| 2,599,881 | Woodruff | June 10, 1952 |